E. T. NEEDHAM.
AUTOMOBILE LOCK.
APPLICATION FILED APR. 15, 1916.

1,215,837.

Patented Feb. 13, 1917.

WITNESSES
Roland T. Williams.
Wm. H. Mulligan

INVENTOR
Edmund T. Needham
BY
Richard Owen.
ATTORNEY

UNITED STATES PATENT OFFICE.

EDMUND T. NEEDHAM, OF SAN ANTONIO, TEXAS.

AUTOMOBILE-LOCK.

1,215,837.　　　　Specification of Letters Patent.　　Patented Feb. 13, 1917.

Application filed April 15, 1916. Serial No. 91,393.

*To all whom it may concern:*

Be it known that I, EDMUND T. NEEDHAM, a citizen of the United States, residing at San Antonio, in the county of Bexar and State of Texas, have invented certain new and useful Improvements in Automobile-Locks, of which the following is a specification.

This invention relates to automobile locks and more particularly to a device of this character which is adapted to prevent the operation of the control pedals of an automobile for preventing the fraudulent tampering of the operating pedals thereof.

As a further object of the invention the device contemplates the provision of a locking means for the control pedals of an automobile which can be manufactured at a minimum of cost and which can be quickly and easily applied to or disconnected from the foot pedals.

A further object of this invention is the provision of a automobile lock which consists of comparatively few parts and is simple in construction, but durable and well adapted to withstand the rough usage to which devices of this character are ordinarily subjected.

Figure 1:
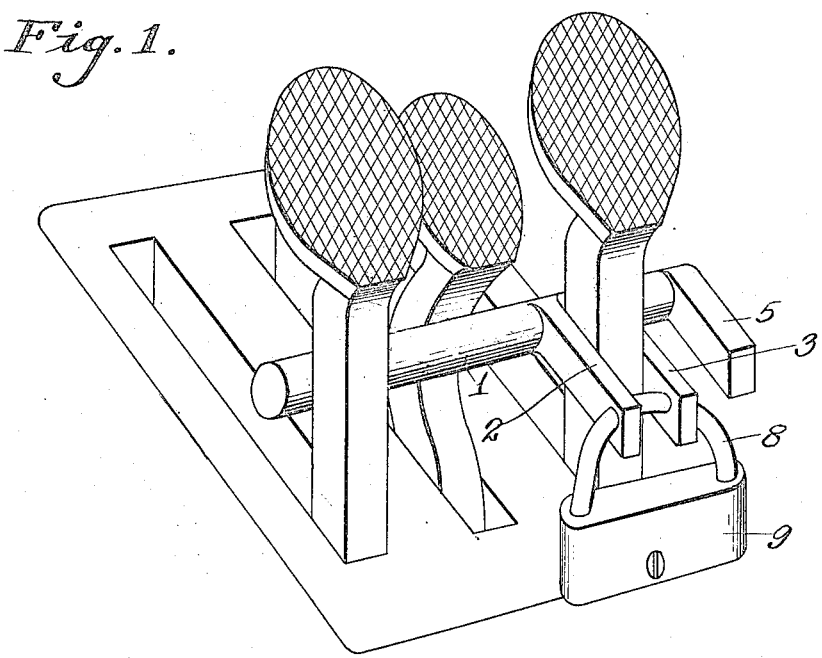

For a full description of the invention and the advantages and merits thereof, reference is to be had to the following description and the accompanying drawings, wherein is illustrated the preferred form of my invention, in which, Figure 1 is a perspective view showing the locking device attached to the foot pedals of an automobile.

Figure 2:
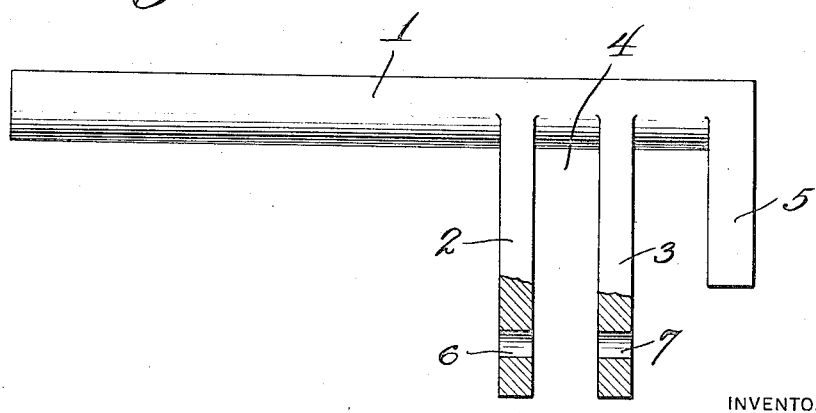

Fig. 2 is a plan view of the locking device partly broken away.

As illustrated by Fig. 1 of the drawing the foot board of the automobile is provided with the usual slots through which the control pedals extend. The clutch, reverse, and brake pedals are shown arranged in juxtaposed relation in the usual manner and, by virtue of the curve in one of the pedal shanks, the disposition of the pedals is taken advantage of in providing the efficient means for locking the control pedals in rigid position. The locking bar 1 is, in this instance formed of a piece of round metal but it will be understood, of course, that any desired shape or length of bar may be employed. Integrally formed with the bar 1 and extending at right angles thereto are a pair of arms 2 and 3 which are spaced apart for a distance equal to the width of one of the control pedals, thereby forming a yoke 4 which embraces one of the foot pedals as shown by Fig. 1 of the drawing. The end of the bar or rod 1 is provided with a right angularly disposed arm 5. The ends of the bars or arms 2 and 3 are provided with apertures 6 and 7 adapted to receive the shackle 8 of a suitable padlock 9. The arm 5 serves as a handle which may be grasped to rotate the rod 1 when it is desired to remove the rod from its place between the pedals.

It is particularly pointed out that the simplicity of the device is one of its most important features. By interposing the rod transversely between the pedals with respect to their lateral disposition, the pedals are effectively locked against movement by the use of a single yoke.

In reduction to practice, I have found that the form of my invention illustrated in the drawings and referred to in the above description as the preferred embodiment, is the most efficient and practicable, yet realizing that the conditions concurrent with the adoption of my device will necessarily vary, I desire to emphasize the fact that minor changes in the details may be resorted to, when required, without sacrificing any of the advantages of my invention, as defined in the appended claims.

I claim:

1. In an automobile lock, the combination of a plurality of control pedals extending upwardly through the footboard of the automobile, the central pedal being curved, while said end pedals are straight, a restraining rod comprising a piece of straight cylindrical material interposed between the pedals for contacting with the concaved edge of the central pedal and with the front edges of the end pedals, and a yoke carried by the said rod and embracing one of the end pedals said yoke adapted to receive the shackle of a padlock whereby the displacement of said rod is prevented.

2. In an automobile lock, the combination of a plurality of control pedals extending upwardly through the footboard of the automobile, said central pedal being curved, while said end pedals are straight, a restraining rod interposed between the pedals for contacting with the concave edge of the central pedal and with the front straight edges of the end pedals, a pair of arms extending at right angles from said rod and contacting with the sides of one of the end pedals, said arms provided with apertures at their free ends, and a padlock having its shackle extended through said apertures.

3. In an automobile lock, the combination of a plurality of control pedals extending upwardly through the footboard of the automobile, a rod interposed transversely between said pedals and contacting with the rear edge of said curved pedal and the front edges of said end pedals, whereby each alternate pedal will be disposed at opposite sides of said rod, a yoke embracing one of said end pedals and comprising a pair of arms integrally formed with said rod and extending at right angles therefrom and contacting with the sides of said end pedal, the ends of said arms having apertures for receiving the shackle of a padlock, the curve of said central pedal adapted to retain said rod above said foot-board.

In testimony whereof I affix my signature in presence of two witnesses.

EDMUND T. NEEDHAM.

Witnesses:
HAROLD L. SADLER,
G. J. WILD.